United States Patent
Ohnishi et al.

(10) Patent No.: US 9,804,575 B2
(45) Date of Patent: Oct. 31, 2017

(54) MULTIPLEX CONTROL DEVICE

(71) Applicant: KABUSHIKI KAISHA TOSHIBA, Minato-ku (JP)

(72) Inventors: Naoya Ohnishi, Kodaira (JP); Hiroshi Nakatani, Tama (JP); Shunya Maruchi, Itabashi (JP); Yukitaka Yoshida, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 240 days.

(21) Appl. No.: 14/837,274

(22) Filed: Aug. 27, 2015

(65) Prior Publication Data

US 2016/0109862 A1    Apr. 21, 2016

(30) Foreign Application Priority Data

Oct. 17, 2014   (JP) ................................ 2014-212809

(51) Int. Cl.
| | |
|---|---|
| G05B 9/03 | (2006.01) |
| G05B 11/01 | (2006.01) |
| G06F 13/38 | (2006.01) |
| G06F 11/18 | (2006.01) |
| G05B 15/02 | (2006.01) |

(52) U.S. Cl.
CPC .............. G05B 11/011 (2013.01); G05B 9/03 (2013.01); G05B 15/02 (2013.01); G06F 11/184 (2013.01); G06F 13/382 (2013.01)

(58) Field of Classification Search
None
See application file for complete search history.

(56) References Cited

U.S. PATENT DOCUMENTS

| | | | |
|---|---|---|---|
| 6,449,732 B1* | 9/2002 | Rasmussen | G05B 9/03 713/400 |
| 6,550,018 B1* | 4/2003 | Abonamah | G06F 11/165 714/11 |
| 2004/0255013 A1* | 12/2004 | Ott | G05B 9/03 709/223 |

* cited by examiner

Primary Examiner — Dennis M Butler
(74) Attorney, Agent, or Firm — Oblon, McClelland, Maier & Neustadt, L.L.P.

(57) ABSTRACT

In one embodiment, a multiplex control device includes three or more control modules to execute same operations for same input signals, and a majority decision module to output an output signal that matches majority of output signals outputted by the control modules. Each control module includes an input module to convert an input signal into an input value, a first determination module to obtain input values from input modules of respective control modules to determine whether majority of input values among the obtained input values match, an operation executing module to execute an operation using the matched input value to generate an output value, a second determination module to obtain output values from operation executing modules of respective control modules to determine whether majority of output values among the obtained output values match, and an output module to convert the matched output value to generate an output signal.

9 Claims, 10 Drawing Sheets

MULTIPLEX CONTROL DEVICE

CROSS REFERENCE TO RELATED APPLICATION

This application is based upon and claims the benefit of priority from the prior Japanese Patent Application No. 2014-212809, filed on Oct. 17, 2014, the entire contents of which are incorporated herein by reference.

FIELD

Embodiments described herein relate to a multiplex control device.

BACKGROUND

Conventionally, a control device for controlling a power plant includes three input modules, three operation modules and three output modules. The control device outputs, as a control signal for controlling the power plant, an output signal obtained by taking the majority of three output signals outputted by three output modules. By this means, even if abnormality occurs in any one of three input modules, three operation modules and three output modules and any one of the output modules cannot therefore perform correct output, a correct control signal is continuously outputted by majority decision. Accordingly, even if the abnormality occurs in any one of three input modules, three operation modules and three output modules, the control device can continue correct control.

In the conventional control device, if the first abnormality is caused in any one of three input modules, three operation modules and three output modules and the second abnormality is then caused in a component of a different kind from a component in which the first abnormality is caused, it becomes impossible to perform a normal majority operation. Therefore, it is necessary to stop processing and enter a safe state. An example of the case where the second abnormality is caused in the component of the different kind from the component in which the first abnormality is caused is a case where the component in which the first abnormality is caused is an input module and the second abnormality is then caused in an operation module or an output module. Therefore, there is a problem that it is not possible to continue control when the abnormality is caused in two components of different kinds.

DETAILED DESCRIPTION

Embodiments will now be explained with reference to the accompanying drawings.

In one embodiment, a multiplex control device includes three or more control modules configured to execute same operations for same input signals in parallel and to output output signals to control a same controlled target. The device further includes a majority decision module configured to output an output signal that matches a majority of the output signals outputted by the three or more control modules, to the controlled target as a control signal that controls the controlled target. Each of the control modules includes an input module configured to obtain an input signal to convert the input signal into an input value. Each of the control modules further includes a first determination module configured to obtain input values from input modules of the respective control modules to determine whether a majority of input values among the obtained input values match. Each of the control modules further includes an operation executing module configured, when the first determination module determines that the majority of input values match, to execute an operation using the matched input value to generate an output value. Each of the control modules further includes a second determination module configured to obtain output values from operation executing modules of the respective control modules to determine whether a majority of output values among the obtained output values match. Each of the control modules further includes an output module configured, when the second determination module determines that the majority of output values match, to convert the matched output value to generate an output signal, and to output the output signal to the majority decision module.

First Embodiment

Figure 1:
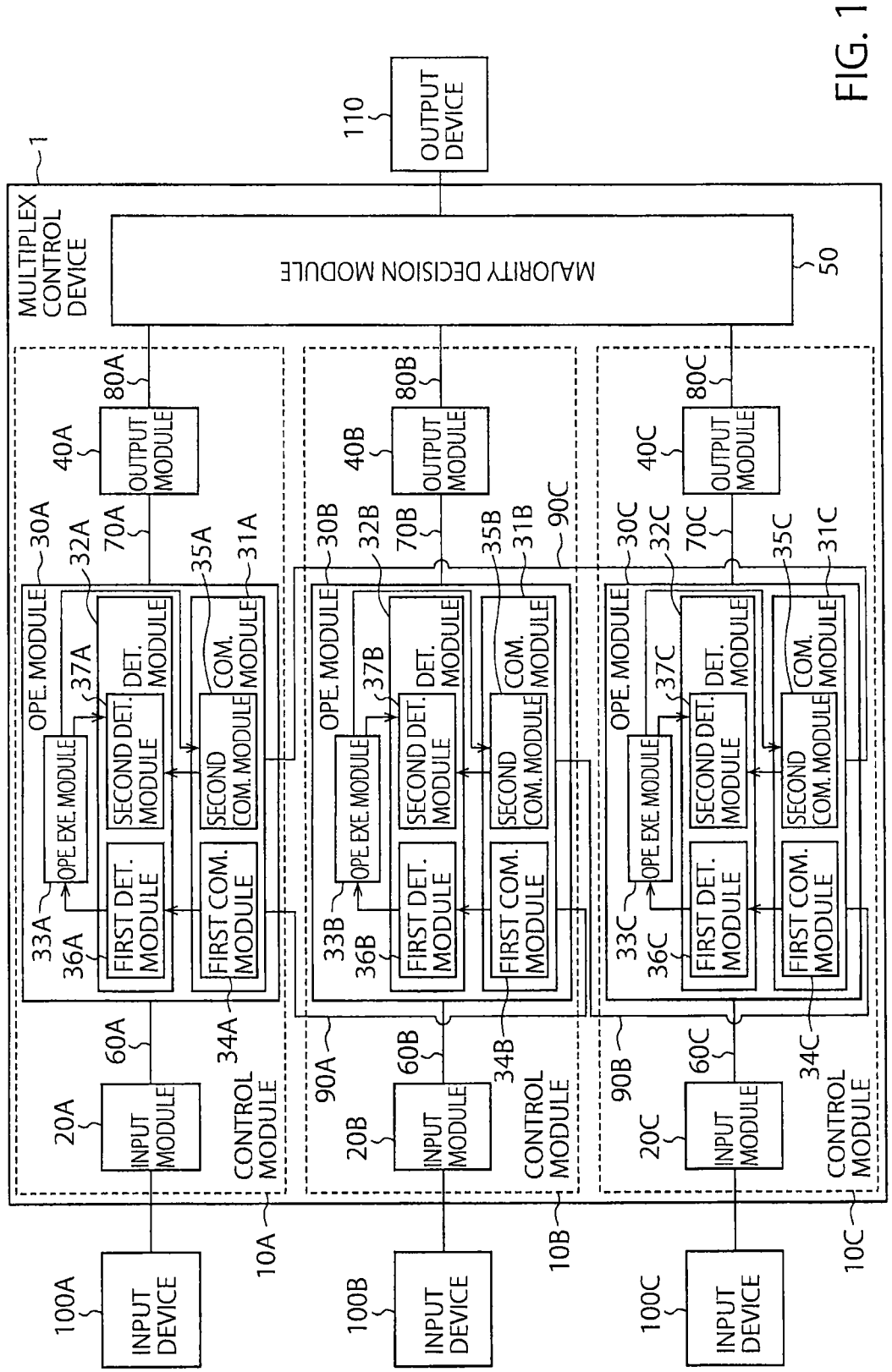
FIG. 1 is a diagram illustrating a configuration of a multiplex control device 1 in a first embodiment.

First, a first embodiment is described. FIG. 1 is a diagram illustrating a configuration of a multiplex control device 1 in the first embodiment. As illustrated in FIG. 1, the multiplex control device 1 includes control modules 10A, 10B and 10C, and a majority decision module 50 connected with the control modules 10A, 10B and 10C.

Each of the control modules 10A, 10B and 10C obtains the same input signal from corresponding input devices 100A, 100B and 100C. The control modules 10A, 10B and 10C perform the same operations on the same input signals in parallel and generate output signals to control an output device 110 that is the same controlled target. The system of the control module 10A is referred to as "A system". Similarly, the system of the control module 10B is referred to as "B system" and the system of the control module 10C is referred to as "C system".

The majority decision module 50 outputs an output signal that matches the majority of the output signals generated by the control modules 10A, 10B and 10C, to the output device 110 of the controlled target as a control signal that controls the controlled target.

Here, the control module 10A includes an input module 20A whose input is connected with the input device 100A, an operation module 30A whose input is connected with the output of the input module 20A, and an output module 40A whose input is connected with the output of the operation module 30A and whose output is connected with the first input of the majority decision module 50. Here, the input module 20A and the operation module 30A are connected by a line 60A such as a fieldbus, and the operation module 30A and the output module 40A are connected by a line 70A such as a fieldbus. Moreover, the output module 40A and the majority decision module 50 are connected by a line 80A such as a fieldbus.

Similarly, the control module 10B includes an input module 20B whose input is connected with the input device 100B, an operation module 30B whose input is connected with the output of the input module 20B, and an output module 40B whose input is connected with the output of the operation module 30B and whose output is connected with the second input of the majority decision module 50. Here, the input module 20B and the operation module 30B are connected by a line 60B such as a fieldbus, and the operation module 30B and the output module 40B are connected by a line 70B such as a fieldbus. Moreover, the output module 40B and the majority decision module 50 are connected by a line 80B such as a fieldbus.

Similarly, the control module 10C includes an input module 20C whose input is connected with the input device 100C, an operation module 30C whose input is connected with the output of the input module 20C, and an output module 40C whose input is connected with the output of the operation module 30C and whose output is connected with the third input of the majority decision module 50. Here, the input module 20C and the operation module 30C are connected by a line 60C such as a fieldbus, and the operation module 30C and the output module 40C are connected by a line 70C such as a fieldbus. Moreover, the output module 40C and the majority decision module 50 are connected by a line 80C such as a fieldbus.

The input modules 20A to 20C obtain an input signal from the corresponding input devices 100A to 100C, respectively and convert it into an input value. For example, in a case where the input devices output digital input signals by a switch, a button or the like, the input modules 20A to 20C perform digital filter processing on the input digital input signals and convert them into input values. Alternatively, in a case where the input devices output analog input signals by a temperature sensor, a pressure sensor or the like, the input modules 20A to 20C perform A/D conversion on the input analog input signals and convert them into input values. Alternatively, in a case where the input devices output pulse input signals by a velocity sensor, a rotation number detection sensor or the like, the input modules 20A to 20C convert them into input values by counting a pulse with respect to the input pulse input signals.

The operation modules 30A to 30C execute an operation and output an output value obtained as a result of the operation to the corresponding output modules 40A to 40C, respectively.

Here, the operation module 30A includes a communication module 31A, a determination module 32A and an operation executing module 33A. The communication module 31A is connected with a communication module 31B by a network 90A of a ring type, and connected with a communication module 31C by a network 90C of the ring type. The communication module 31A transmits an input value and an output value to the other communication modules 31B and 31C, and receives input values and output values from the other communication modules 31B and 31C. Here, the communication module 31A includes a first communication module 34A and the second communication module 35A.

Similarly, the operation module 30B includes the communication module 31B, a determination module 32B and an operation executing module 33B. The communication module 31B is connected with the communication module 31C by a network 90B of the ring type. The communication module 31B transmits an input value and an output value to the other communication modules 31A and 31C, and receives input values and output values from the other communication modules 31A and 31C. Here, the communication module 31B includes a first communication module 34B and a second communication module 35B.

Similarly, the operation module 30C includes the communication module 31C, a determination module 32C and an operation executing module 33C. The communication module 31C transmits an input value and an output value to the other communication modules 31A and 31B, and receives input values and output values from the other communication modules 31A and 31B. Here, the communication module 31C includes the first communication module 34C and the second communication module 35C.

The first communication modules 34A to 34C transmit an input value obtained by the conversion by the corresponding input module to other communication modules, and receive input values obtained by the conversion by input modules included in other control modules than the corresponding control module from the other communication modules. For example, in the case of the first communication module 34A, the first communication module 34A transmits an input value obtained by the conversion by the input module 20A included in the corresponding control module 10A to the other communication modules 31B and 31C, and receives input values obtained by the conversion by the input modules 20B and 20C included in the control modules 10B and 10C other than the corresponding control module 10A from the other communication modules 31B and 31C.

The second communication modules 35A to 35C transmit an output value obtained by the operation by an operation module included in the corresponding control module to other communication modules, and receive output values obtained by the operation by operation modules included in other control modules than the corresponding control module from other communication modules. For example, in the case of the second communication module 35A, the second communication module 35A transmits an output value obtained by the operation by the operation module 30A included in the corresponding control module 10A to the other communication modules 31B and 31C, and receives output values obtained by the operation by the operation modules 30B and 30C included in the control modules 10B and 10C other than the corresponding control module 10A from the other communication modules 31B and 31C.

The first communication module 34B transmits an input value input in the corresponding operation module to the other communication modules and receives input values input in the other operation modules from the other communication modules. The second communication module 35B transmits an output value obtained by operation by the corresponding operation module to the other communication modules and receives output values obtained by operation by the other operation modules from the other communication modules.

The determination modules 32A to 32C compare the input values or output values of the operation modules of other systems with the input value or output value of the operation module of the corresponding system. Here, the determination module 32A includes a first determination module 36A and a second determination module 37A, the determination module 32B includes a first determination module 36B and a second determination module 37B, and the determination module 32C includes a first determination module 36C and a second determination module 37C.

The first determination modules 36A to 36C obtain input values from the input modules 20A to 20C, respectively, and determine whether a majority of input values of the obtained input values match. The second determination modules 37A to 37C obtain output values from the operation modules 30A to 30C, respectively, and determine whether a majority of output values of the obtained output values match.

In a case where the first determination module included in the corresponding control module determines that a majority of input values match, each of the operation modules 30A to 30C, specifically, each of the operation executing modules 33A to 33C executes an operation by the use of the matched input value.

Specifically, for example, in a case where the corresponding first determination modules 36A to 36C determine that a majority of input values match, each of the operation executing modules 33A to 33C executes an operation by the use of the matched input value and generates an output value. Further, for example, in a case where the corresponding second determination modules 37A to 37C determine that a majority of output values match, the operation executing modules 33A to 33C output the matched output value to the output modules 40A to 40C, respectively.

When the communication modules 31A to 31C are connected through the networks 90A to 90C, the first communication modules 34A to 34C are connected through the networks 90A to 90C and the second communication modules 35A to 35C are connected through the networks 90A to 90C.

For example, the communication modules 31A to 31C, the determination modules 32A to 32C and the operation executing modules 33A to 33C are mounted by individual integrated circuit (IC). For example, the operation executing modules 33A to 33C are mounted by a central processing unit (CPU), and the determination modules 32A to 32C and the communication modules 31A to 31C are mounted by a field-programmable gate array (FPGA).

In a case where the second determination module included in the corresponding control module determines that a majority of output values match, each of the output modules 40A to 40C generates an output signal by converting this matched output value and outputs this output signal to the majority decision module 50. In the present embodiment, as one specific example, this matched output value is input in the corresponding output modules 40A to 40C from the operation modules 30A to 30C. Therefore, the output modules 40A to 40C convert the output values input from the corresponding operation modules 30A to 30C respectively into output signals and output these output signals to the majority decision module 50. For example, the output modules 40A to 40C convert a digital output value of an LED indicator or the like into an output signal. Alternatively, the output modules 40A to 40C convert an analog output value of a motor or the like into an output signal of voltage or the like.

Hereafter, the input devices 100A to 100C are generically referred to as "input device 100" and the control modules 10A to 10C are generically referred to as "control module 10". Moreover, the input modules 20A to 20C are generically referred to as "input module 20", the operation modules 30A to 30C are generically referred to as "operation module 30", and the output modules 40A to 40C are generically referred to as "output module 40".

Moreover, the communication modules 31A to 31C are generically referred to as "communication module 31", the determination modules 32A to 32C are generically referred to as "the determination module 32", and the operation executing modules 33A to 33C are generically referred to as "operation executing module 33". Moreover, the first communication modules 34A to 34C are generically referred to as "first communication module 34", and the second communication modules 35A to 35C are generically referred to as "second communication module 35". Moreover, the first determination modules 36A to 36C are generically referred to as "first determination module 36", and the second determination modules 37A to 37C are generically referred to as "second determination module 37".

Figure 2:
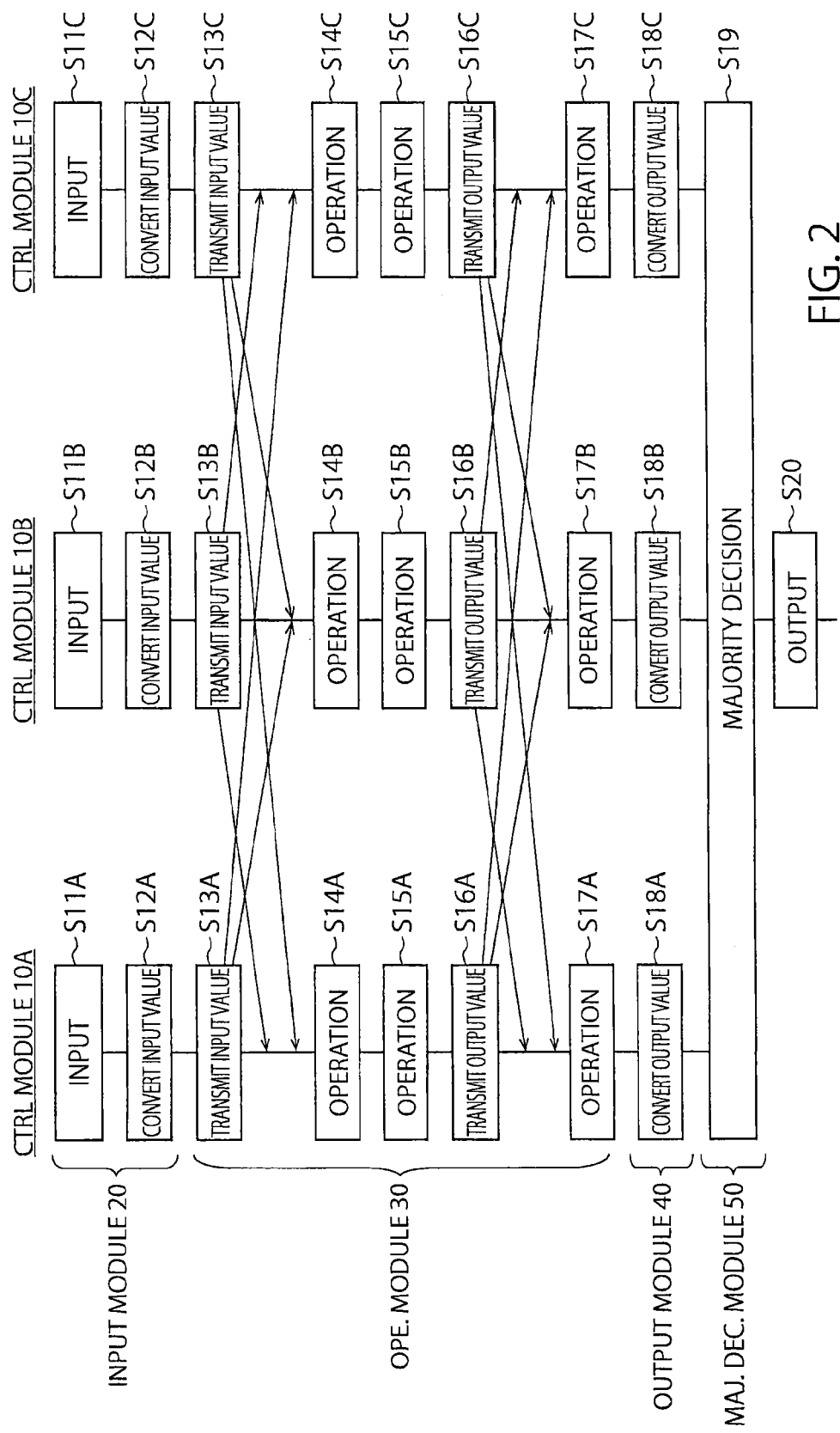
FIG. 2 is a sequence diagram illustrating a flow of signals at normal time in the first embodiment.

Subsequently, the flow of signals at normal time is described using FIG. 2. FIG. 2 is a sequence diagram illustrating the flow of signals at normal time in the first embodiment.

(Steps S11A to S11C) The input module 20 of each control module 10 obtains an input signal from the input device 100.

(Steps S12A to S12C) The input module 20 of each control module 10 converts the input signal into an input value.

(Steps S13A to S13C) The first communication module 34 in the operation module 30 of each control module 10 transmits the input value to the first communication module 34 of another control module 10.

(Steps S14A to S14C) The first determination module 36 in the operation module 30 of each control module 10 determines whether a majority of input values match among three input values. In this determination, in a case where the input values are analog values, the first determination module 36 may determine that they are equal if a difference in the input values is in a threshold decided beforehand. Here, it is assumed that three input values match.

(Steps S15A to S15C) The operation executing module 33 in the operation module 30 of each control module 10 executes an operation by the use of the input value.

(Steps S16A to S16C) The second communication module 35 in the operation module 30 of each control module 10 transmits an output value to the second communication module of another control module.

(Steps S17A to S17C) The second determination module 37 in the operation module 30 of each control module 10 determines whether a majority of output values match among three output values. In this determination, in a case where the output values are analog values, the second determination module 37 may determine that they are equal if a difference in the output values is in a threshold decided beforehand. Here, it is assumed that three input values match. The operation module 30 of each control module 10 outputs this matched output value to the output module 40.

(Steps S18A to S18C) The output module 40 of each control module 10 converts the input output value into an output signal and outputs this output signal to the majority decision module 50.

(Steps S19 and S20) The majority decision module 50 decides an output signal with which the majority of three output signals match, and outputs the decided output signal to the output device 110 that is the controlled target, as a control signal that controls the controlled target.

Figure 3:
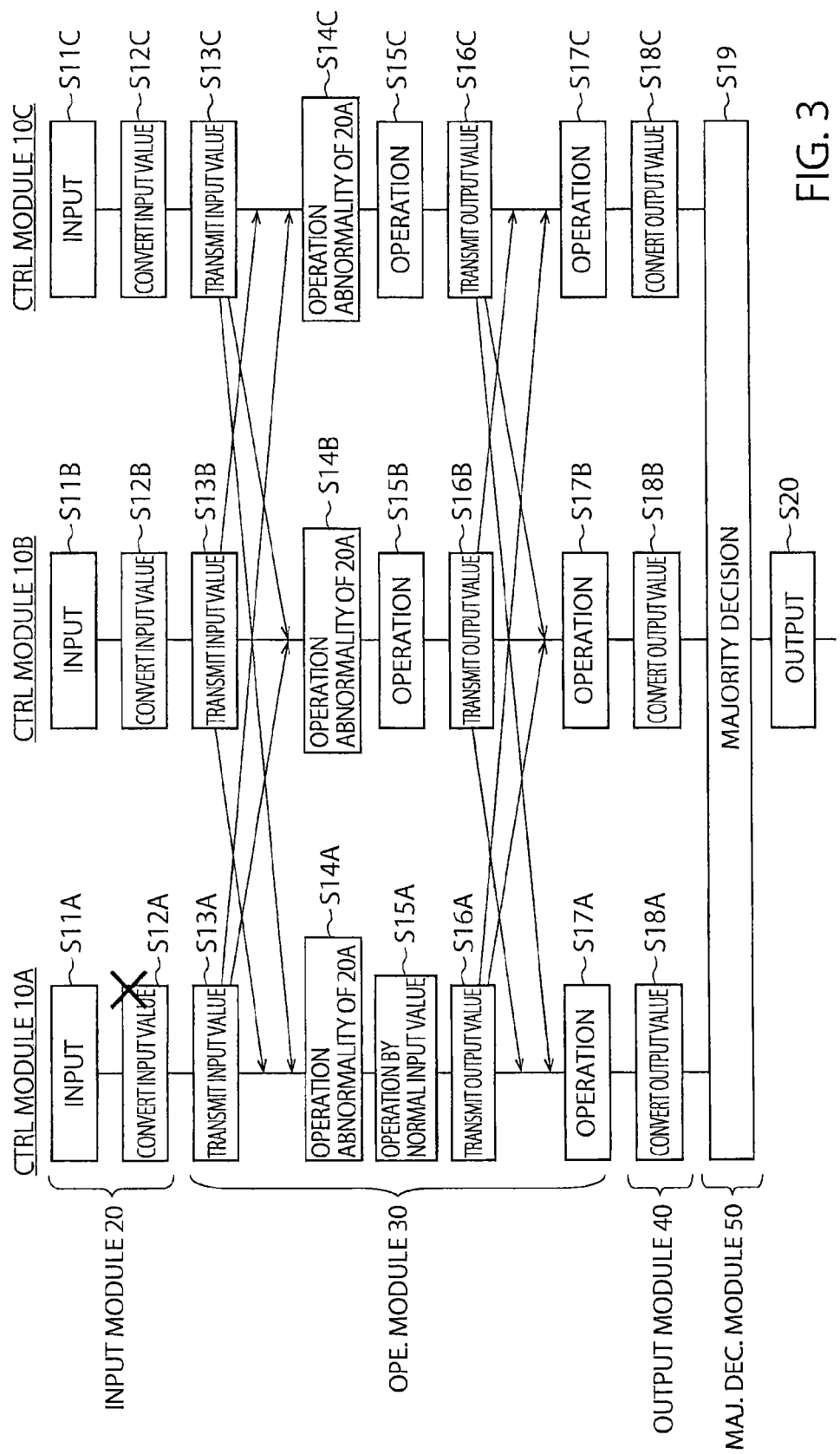
FIG. 3 is a sequence diagram illustrating a flow of signals in a case where the input module 20A is abnormal.

Subsequently, the flow of processing in a case where the input module 20A is abnormal is described. FIG. 3 is a sequence diagram illustrating the flow of signals in a case where the input module 20A is abnormal. As for the same processing as the processing in FIG. 2, the same reference numerals are assigned and the detailed explanation is omitted.

(Steps S14A to S14C) The first determination module 36 in the operation module 30 of each control module 10 determines whether a majority of input values match among three input values. In this determination, since it turns out that the input value from the input module 20A is different from the other input values, the abnormality of the input module 20A is detected. Moreover, the input values from the input modules 20B and 20C match, and it turns out that this matched input value is a normal input value.

Therefore, in step S15A, the operation executing module 33A executes operation processing by the use of this matched input value (normal input value). Moreover, in steps S15B and S15C, the operation executing modules 33B and 33C execute operation processing by the use of this matched input value (normal input value).

Afterward, in steps S17A to S17C, the second determination module 37 in the operation module 30 of each control module 10 determines whether a majority of output values match among three output values. Here, three output values match because abnormality is not found in the operation modules 30A to 30C. Further, three same output signals are input in the majority decision module 50, and this output signal is output as a control signal. By this means, in a case where the input module 20A is abnormal, the multiplex control device 1 can output a normal control signal.

Figure 4:
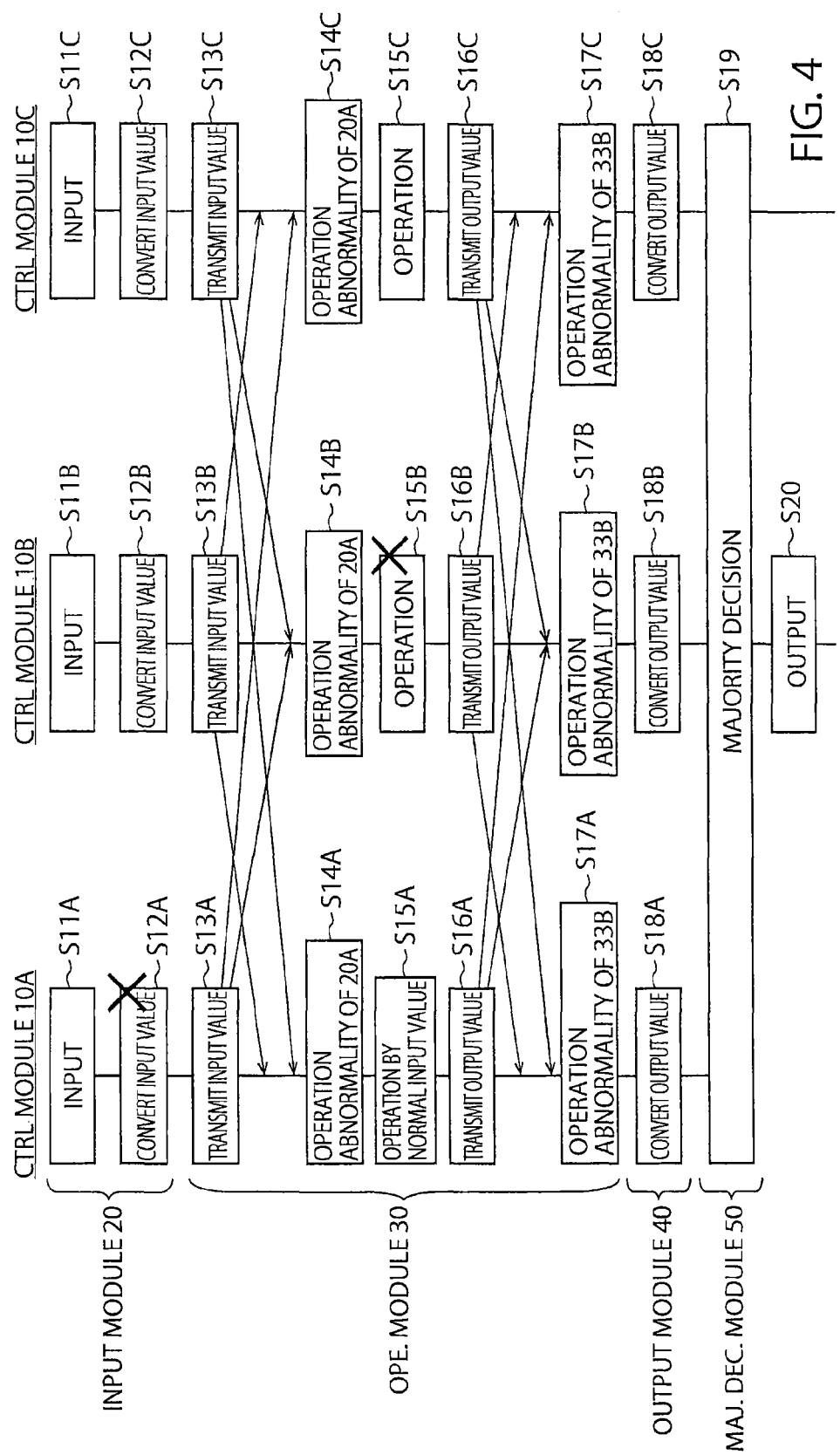
FIG. 4 is a sequence diagram illustrating a flow of signals in a case where the input module 20A and the operation executing module 33B are abnormal.

Subsequently, the flow of processing in a case where the operation executing module 33B is abnormal in addition to the input module 20A is described. FIG. 4 is a sequence diagram illustrating the flow of signals in a case where the input module 20A and the operation executing module 33B are abnormal. The detailed explanation is omitted for the same processing as the processing in FIG. 3.

(Steps S17A to S17C) The second determination module 37 in the operation module 30 of each control module 10 determines whether a majority of output values match among three output values. In this determination, since it turns out that the output value of the operation executing module 33B is different from the other output values, abnormality in the operation executing module 33B is detected. Moreover, the output values of the operation executing modules 33A and 33C match, and it turns out that this matched output value is a normal output value. Each operation module 30 outputs this matched output value to the corresponding output module 40.

Therefore, in steps S18A to S18C, the operation executing module 33 converts this matched output value (normal output value) into an output signal. By this means, three matched output signals are input in the majority decision module 50, and this matched output signal is output to the output device 110 as a control signal. By this means, even in a case where the operation executing module 33B is abnormal in addition to the input module 20A, the multiplex control device 1 can output a normal control signal.

Moreover, in a case where abnormality is further caused in any of the output modules 40A to 40C in addition to the input module 20A and the operation executing module 33B, it is possible to output a normal control signal by majority operation in the majority decision module 50.

Figure 5:
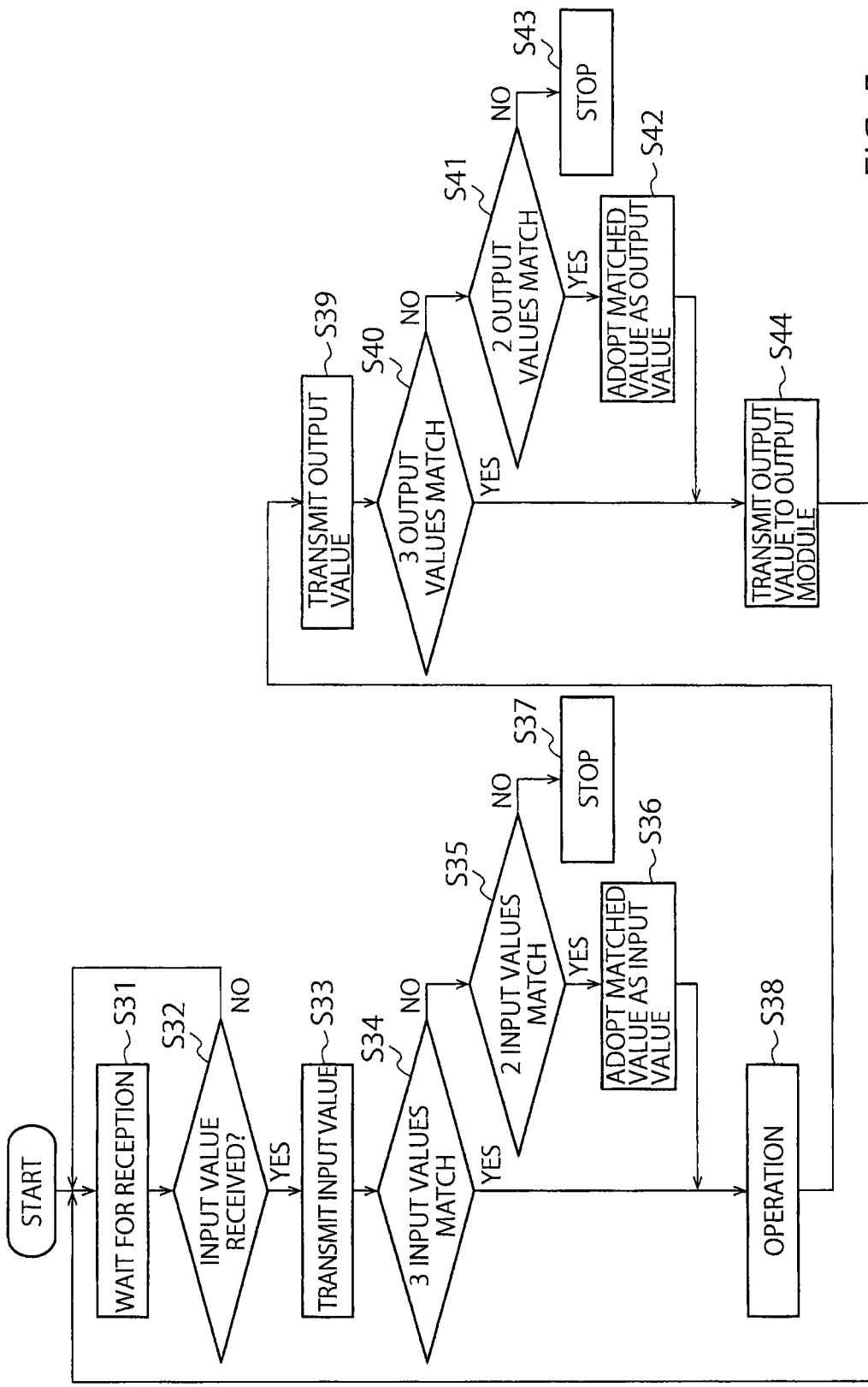
FIG. 5 is a flowchart illustrating an example of the processing in the operation module 30 in the first embodiment.

Subsequently, details of the above-mentioned processing in the operation module 30 are described. FIG. 5 is a flowchart illustrating an example of the processing in the operation module 30 in the first embodiment. The following processing is processing performed in each operation module 30.

(Step S31) First, the operation module 30 waits that an input value is input.

(Step S32) Next, the operation module 30 determines whether the input value has been received.

(Step S33) In a case where it is determined that the input value has been received in step S32, each first communication module 34 transmits the input value to other first communication modules 34. By this means, each first communication module 34 receives input values from other first communication modules 34.

(Step S34) Next, the first determination module 36 determines whether three input values match. In a case where three input values match (YES in step S34), the processing proceeds to step S38.

(Step S35) In a case where it is determined that three input values do not match in step S34 (NO in step S34), the first determination module 36 determines whether two input values of three input values match.

(Step S36) In a case where it is determined that two input values of three input values match in step S35 (YES in Step S35), the operation executing module 33 adopts the matched value as an input value, and the processing proceeds to step S38.

(Step S37) In a case where it is determined that two input values of three input values do not match in step S35 (NO in step S35), the control module 10 executes control stop processing. In this way, in a case where the first determination module 36 determines that a majority of input values do not match, the control module 10 stops the control of the controlled target. By this means, the output of a control signal is stopped.

(Step S38) Next, the operation executing module 33 executes operation processing.

(Step S39) Next, each second communication module 35 transmits an output value to other second communication modules 35. By this means, each second communication module 35 receives output values from other second communication modules 35.

(Step S40) Next, the second determination module 37 determines whether three output values match. The processing proceeds to step S44 in a case where three output values match.

(Step S41) In a case where it is determined that three output values do not match in step S40 (NO in step S40), the second determination module 37 determines whether two output values of three output values match.

(Step S42) In a case where it is determined that two output values of three output values match in step S41 (YES in step S41), the second determination module 37 adopts the matched value as an output value, and the processing proceeds to step S44.

(Step S43) In a case where it is determined that two output values of three output values do not match in step S41 (NO in step S41), the control module 10 executes control stop processing. In this way, the control module 10 stops the control of the controlled target in a case where the second determination module 37 determines that a majority of input values do not match. By this means, the output of a control signal is stopped.

(Step S44) The second determination module 37 outputs the output value to the output module 40, and the processing returns to step S31.

As mentioned above, the multiplex control device 1 according to the first embodiment includes three or more control modules 10 that execute the same operations in parallel for the same input signals and output the output signals to control the same controlled target. In addition, the multiplex control device 1 includes the majority decision module 50 that outputs an output signal that matches the majority of output signals outputted by the control module 10, to the controlled target as a control signal that controls the controlled target.

Each of the control modules 10 includes the input module 20 that obtains an input signal and converts it into an input value. In addition, each of the control modules 10 includes the first determination module 36 that obtains the input value from each of the input modules 20 and determines whether a majority of input values of multiple obtained input values match. In addition, each of the control modules 10 includes the operation executing module 33 that executes an operation by the use of a matched input value and generates an output value in a case where the first determination module 36 determines that a majority of input values match. In addition, each of the control modules 10 includes the second determination module 37 that obtains the output value from each of the operation executing modules 33 and determines whether a majority of output values of multiple obtained output values match. In addition, each of the control modules 10 includes the output module 40 that converts a matched output value and generates an output signal in a case where the second determination module 37 determines that a majority of output values match, and outputs the output signal to the majority decision module 50.

In a case where the first determination module 36 included in the corresponding control module 10 determines that a majority of input values match, each of the operation modules 30 executes an operation by the use of this input matched value. In a case where the second determination module 37 included in the corresponding control module 10 determines that a majority of output values match, each of the output modules 40 converts this matched output value and generates an output signal.

By this means, even in a case where abnormality occurs in any one of the input modules 20A to 20C, each operation executing module 33 executes an operation by the use of an input value that matches the majority of the input values outputted by the input modules 20A to 20C. Therefore, each operation executing module 33 can execute an operation by the use of a normal input value outputted by the input module 20 in which abnormality does not occur. Moreover, even in a case where abnormality occurs in any one of the operation executing modules 33A to 33C, each output module 40 converts an output value that matches the majority of output values obtained by operation by the operation executing modules 33A to 33C. Therefore, each output module 40 can perform conversion by the use of a normal output value obtained by operation by the operation executing module 33 in which abnormality does not occur. Moreover, even in a case where abnormality occurs in any one of the output modules 40A to 40C, the majority decision module 50 outputs an output signal that matches the majority of output signals obtained by conversion by the output modules 40A to 40C, as a control signal. Therefore, the majority decision module 50 can output an output signal obtained by conversion by the output module 40 in which abnormality does not occur, as a control signal.

Therefore, even in a case where abnormality occurs in at least two of any one of the input modules 20A to 20C, any one of the operation modules 30A to 30C and any one of the output modules 40A to 40C, since the multiplex control device 1 can keep outputting a normal control signal, it is possible to continue control of high reliability.

Moreover, the control module 10 stops the control of a controlled target in a case where the first determination module 36 determines that a majority of input values do not match. The control module 10 stops the control of the controlled target in a case where the second determination module 37 determines that the majority of output values do not match. By this means, for example, in a case where there are three control modules 10 like the present embodiment and all of three input values do not match, since there is abnormality in two or more of the input modules 20A to 20C, the control module 10 stops the control of the controlled target. As a result, it is possible to prevent a wrong control signal from being output and prevent wrong control from being continued. Moreover, in a case where there are three control modules 10 like the present embodiment and all of three output values do not match, since there is abnormality in two or more of the operation modules 30A to 30C, the control module 10 stops the control of the controlled target. As a result, it is possible to prevent a wrong control signal from being output and prevent wrong control from being continued.

Figure 6:
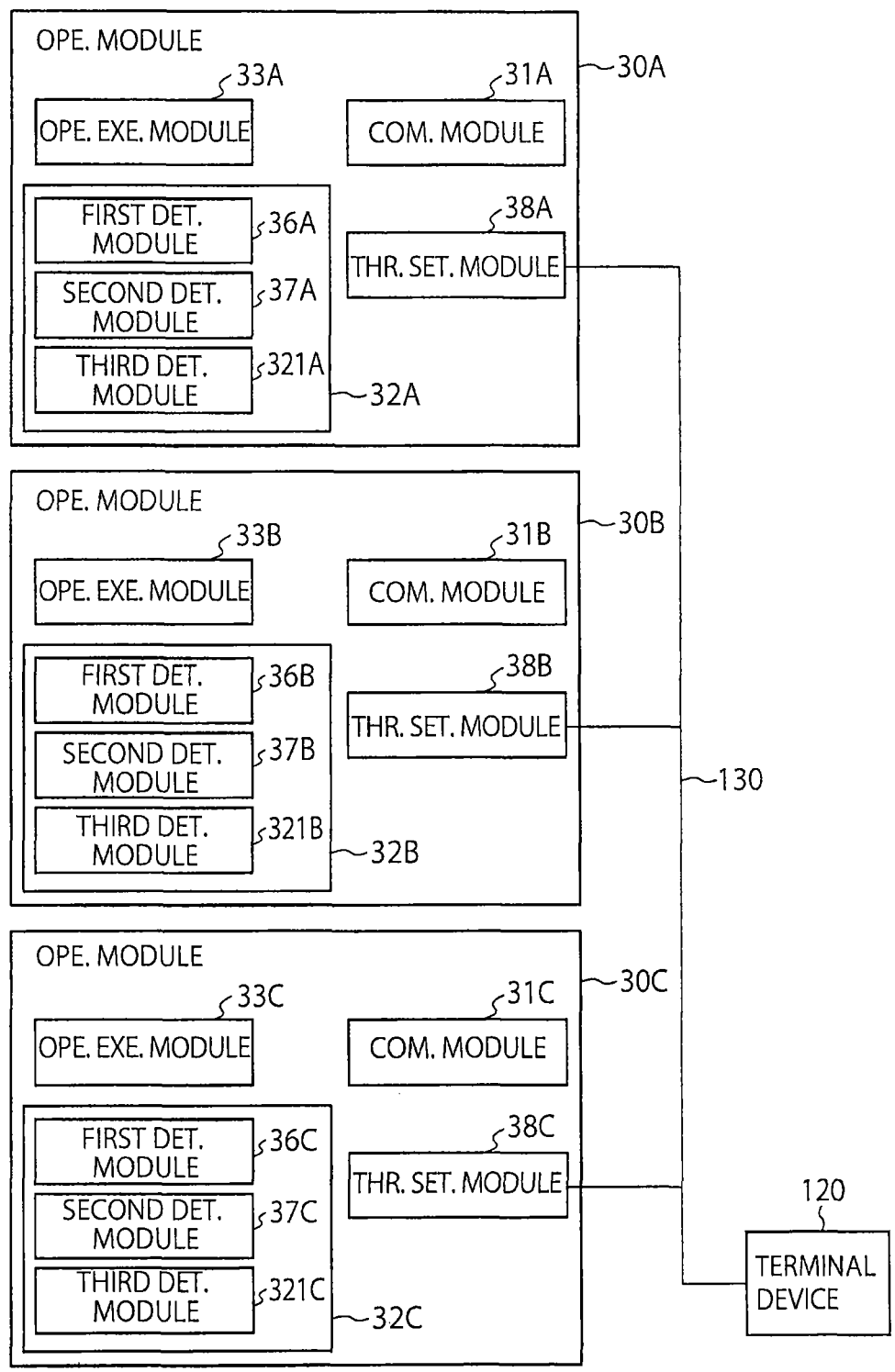
FIG. 6 is a diagram illustrating a configuration of a modification of the operation module 30 in the first embodiment.

In a case where a threshold used to find whether input values and output values match is set, as illustrated in FIG. 6, the operation modules 30A to 30C may further include threshold setting modules 38A to 38C that are connected with a terminal device 120 through a network 130 and can perform communication with the terminal device 120. FIG. 6 is a diagram illustrating a configuration of a modification of the operation module 30 in the first embodiment.

In a triplicated device like the multiplex control device 1 of the present embodiment, it is necessary to use the same threshold in all of the first determination modules 36A to 36C, and it is necessary to use the same threshold in all of the second determination modules 37A to 37C. Therefore, in a case where a program of the multiplex control device is designed, the designer of the multiplex control device 1 sets the same threshold through the terminal device 120.

The threshold setting modules 38A to 38C obtains threshold information that shows a threshold from the terminal device 120 of the outside, and preserves this threshold information. By this means, if the difference of multiple input values is within this threshold, the first determination modules 36A to 36C determine that they match each other. Moreover, if the difference of multiple output values is within this threshold, the second determination modules 37A to 37C determine that they match each other.

Figure 7:
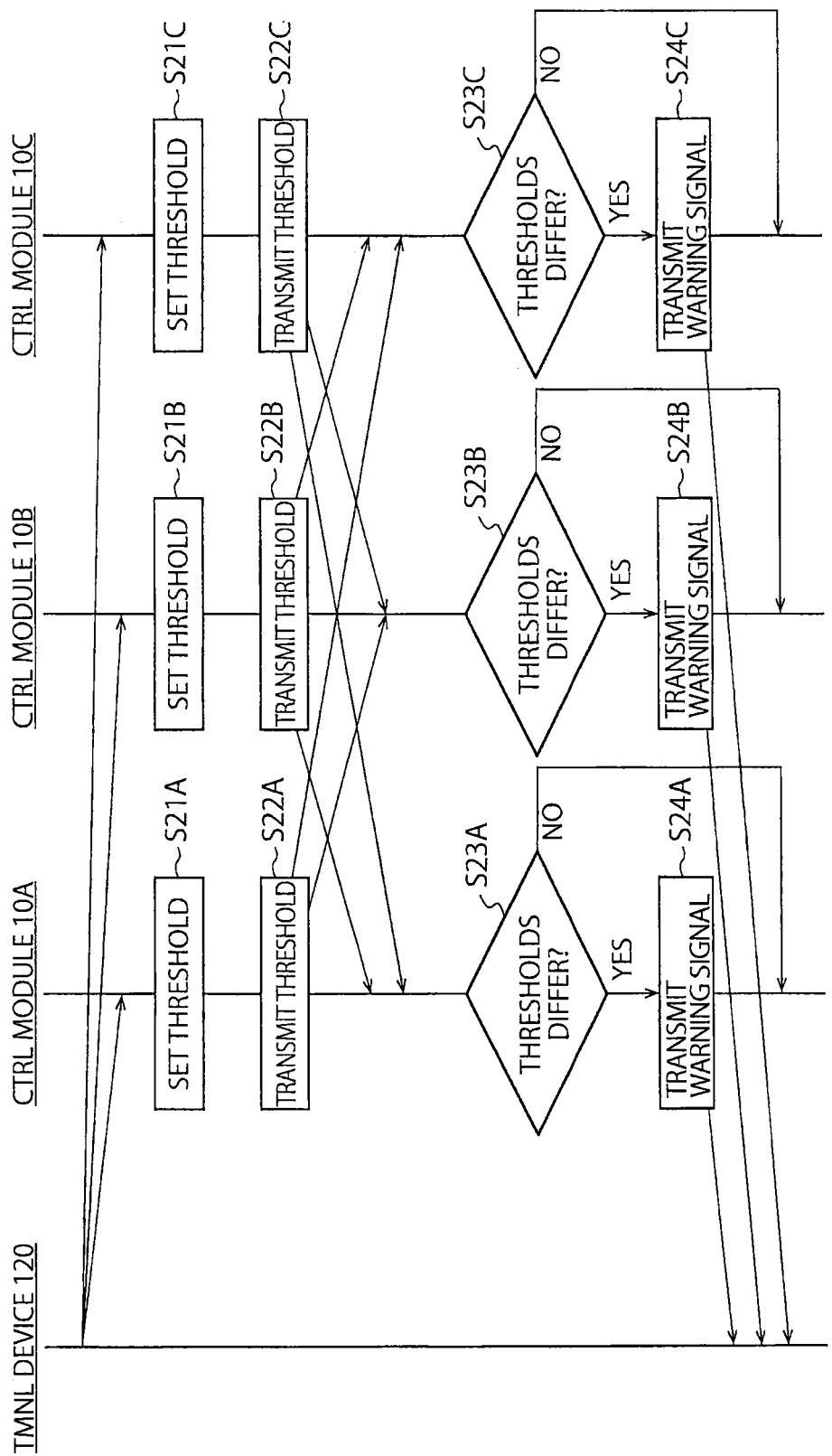
FIG. 7 is a sequence diagram illustrating an example of the processing when a threshold is set.

Subsequently, the sequence of processing when a threshold is set using FIG. 7 is described. FIG. 7 is a sequence diagram illustrating an example of the processing when the threshold is set.

(Steps S21A to S21C) The threshold setting modules 38A to 38C receive and hold threshold information that shows a threshold from the terminal device 120.

(Steps S22A to S22C) The communication modules 31A to 31C mutually transmit thresholds stored in the threshold setting modules 38A to 38C. Specifically, the communication modules 31A to 31C transmit threshold information stored in the threshold setting modules 38A to 38C to other control modules than the corresponding control module of three or more control modules, and receive plural pieces of threshold information transmitted from other control modules than the corresponding control module of three or more control modules.

(Steps S23A to S23C) The determination modules 32A to 32C further include third determination module 321A to 321C, respectively, and the third determination modules 321A to 321C determine whether thresholds shown by plural pieces of received threshold information and a threshold shown by transmitted threshold information are different.

(Steps S24A to S24C) In a case where the third determination modules 321A to 321C determine that the thresholds are different in steps S23A to S23C, the threshold setting modules 38A to 38C transmit a warning signal to the terminal device 120. The terminal device 120 having received the warning signal displays information that shows warning, and notifies that the resetting of the threshold is requested. In this way, by enabling the threshold setting, it is possible to allow the range of error of the analog value and determine that input values match.

In this way, each of the operation modules 30 includes a threshold setting module 38 that obtains threshold information showing a threshold from the terminal device 120 of the outside and stores the threshold information. By this means, it is possible to set thresholds used for determination by the first determination module 36 and the second determination module 37 at a time.

Moreover, the communication modules 31A to 31C transmit threshold information stored in the threshold setting modules 38A to 38C to other control modules than the corresponding control module of three or more control modules, and receive plural pieces of threshold information transmitted from other control modules than the corresponding control module of three or more control modules. The third determination modules 321A to 321C determine whether thresholds shown by plural pieces of received threshold information and a threshold shown by transmitted threshold information are different. In a case where the third determination modules 321A to 321C determine that the thresholds are different, the corresponding threshold setting modules 38A to 38C transmit a warning signal to the terminal device 120. By this means, the terminal device 120 having received the warning signal can urge the designer to reset the threshold by notifying that the resetting of the threshold is requested.

In a case where abnormality is caused in the networks 90A to 90C among the operation modules 30, there is a possibility that it is determined that the input modules 20A to 20C and the operation modules 30A to 30C are abnormal though the input modules 20A to 20C and the operation modules 30A to 30C perform normal operation. Then, in a case where each of the first communication modules 34A to 34C receives an input value from another first communication module, it may transmit the received input value to other first communication module(s) except the first communication module that is the transmission source of the received input value. This processing is referred to as "duplication of communication". The flow of processing in that case is described using FIG. 8.

Figure 8:
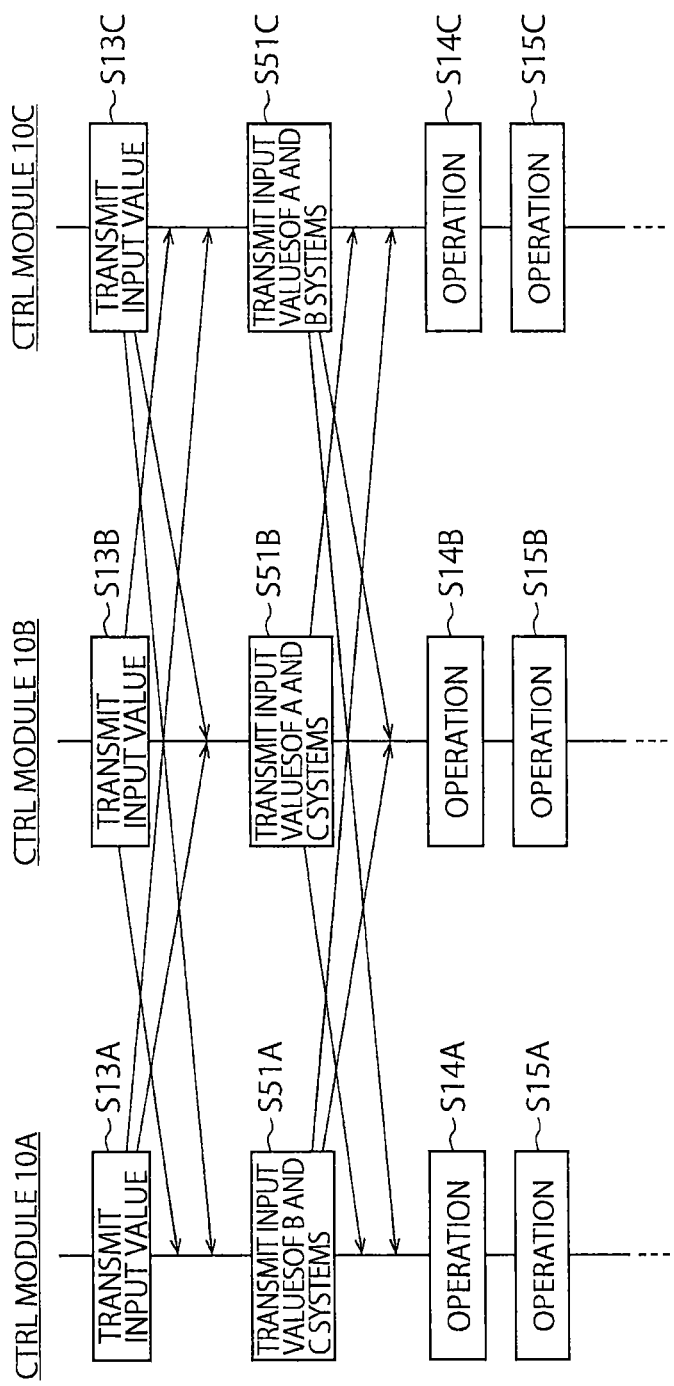
FIG. 8 is a sequence diagram illustrating an example of the processing in the case where communication between the operation modules 30A to 30C is doubled.

FIG. 8 is a sequence diagram illustrating an example of the processing in the case where communication between the operation modules 30A to 30C is doubled. Here, since similar processing is executed between the control modules 10, the control module 10A is focused and described.

(Step S13A) For example, the first communication module 34A transmits an input value to the first communication module 34B and the first communication module 34C. Moreover, the first communication module 34A receives the input values of the first communication module 34B and the first communication module 34C.

(Step S51A) After the input values are input, the first communication module 34A transmits the input value received from the first communication module 34B to the first communication module 34C and transmits the input value received from the first communication module 34C to the first communication module 34B. By doing so, even in a case where one of the networks 90A to 90C among the communication modules 31 is abnormal, it is possible to propagate each input value to the first communication modules 34A to 34C and perform normal determination processing by the first determination module 36. Since following steps S14A and S15A are similar to steps S14A and S15A in FIG. 2, the explanation is omitted.

Moreover, similarly, in a case where each of the second communication modules 35A to 35C receives an output value from another second communication module, it may transmit the received output value to other second communication module(s) except the second communication module that is the transmission source of the received output value. By this means, even in a case where one of the networks 90A to 90C among the communication modules 31 is abnormal, it is possible to propagate each output value to the second communication modules 35A to 35C, perform normal determination processing by the second determination module 37 and output a normal output value.

Second Embodiment

Subsequently, a second embodiment is described. In the first embodiment, the operation modules 30 are connected by the networks 90A to 90C of a ring type. On the other hand, the operation modules 30 are connected by a bus in the second embodiment.

Figure 9:
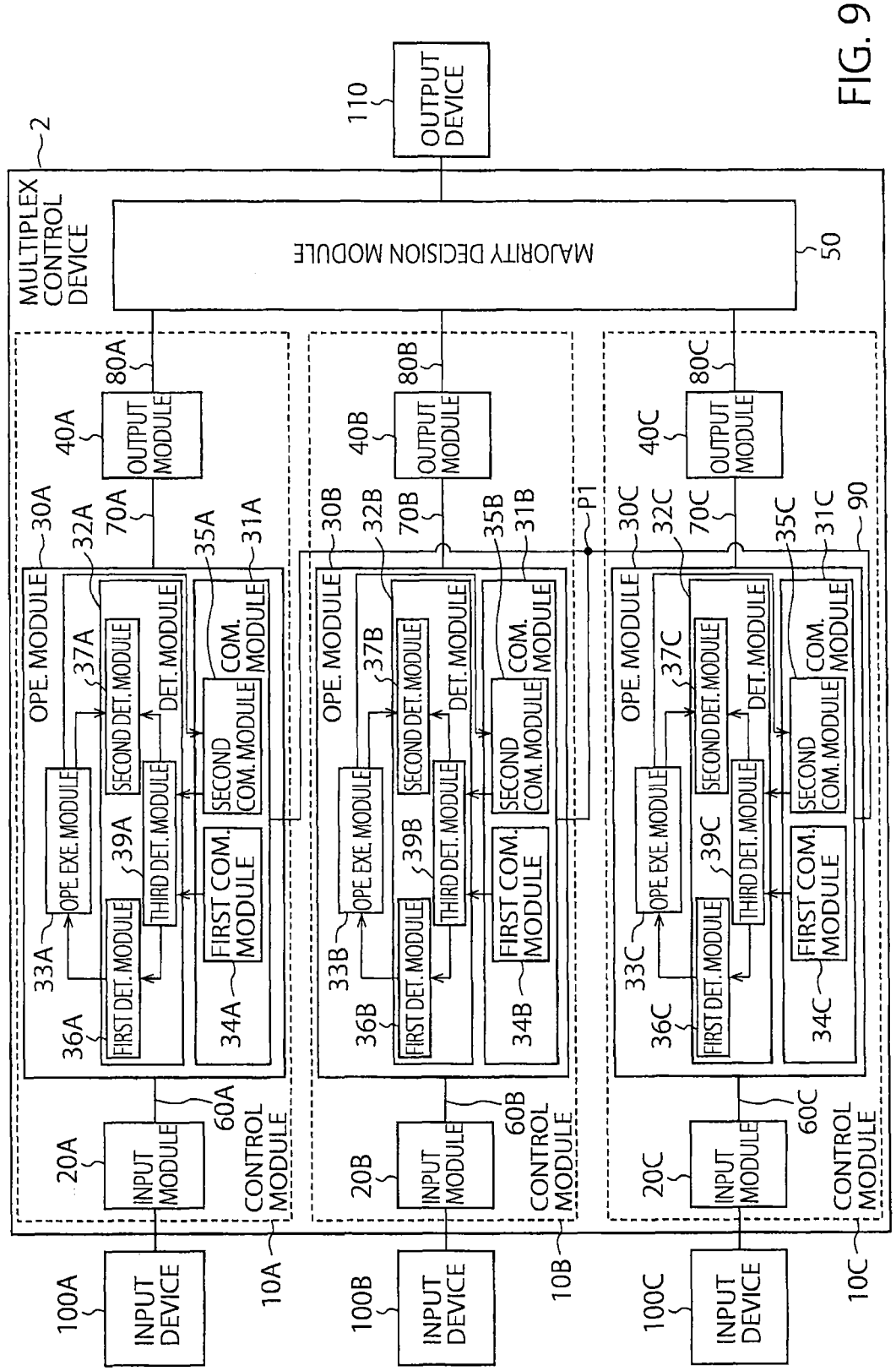
FIG. 9 is a diagram illustrating a configuration of a multiplex control device 2 in a second embodiment.

FIG. 9 is a diagram illustrating a configuration of a multiplex control device 2 in the second embodiment. The same reference numerals are assigned to the same components as the multiplex control device 1 of the first embodiment illustrated in FIG. 1, and overlapping explanation is omitted. As illustrated in FIG. 9, the configuration of the multiplex control device 2 in the second embodiment is a changed configuration in which third determination modules 39A to 39C are further added to the determination modules 32A to 32C, respectively and the communication modules 31 are connected by a bus, as compared with the multiplex control device 1 of the first embodiment. That is, the first communication modules 34 are connected by a bus 90, and the second communication modules 35 are connected by the bus 90. Hereafter, the third determination modules 39A to 39C are generically referred to as "third determination module 39".

Similar to the first embodiment, the operation of the operation modules 30A to 30C is to receive input values from the input modules 20A to 20C, transmit the input values to other operation modules 30A to 30C by the bus 90, perform determination processing and thereafter perform operation processing. After the operation processing, an output value is transmitted to other operation modules 30A to 30C by the bus 90, and, after determination processing is performed, the output value is output to the output modules 40A to 40C.

Moreover, in a case where abnormality is caused in part of the bus 90, there is a possibility that the determination modules 32A to 32C determine that two input values or two output values are abnormal. However, it is necessary to avoid the stop of output when the bus 90 that is a function for diagnosis is abnormal. Therefore, in the present embodiment, in a case where it is determined that two input value received from other control modules or two output values received from other control modules are abnormal, the operation modules 30A to 30C adopt an input value obtained by conversion by the input module of the corresponding system or an output value obtained by operation by itself, output a warning signal to the terminal device 120 which is not illustrated and continue control.

Specifically, for example, the third determination module 39 determines whether multiple input values received by the first communication module 34 or multiple output values received by the second communication module 35 are abnormal, on the basis of information on a predetermined address in multiple frames received by the first communication module 34 or information on a predetermined address in multiple frames received by the second communication module 35. Here, in the determination as to whether the input values or output values of other systems are abnormal, the non-updating of a sequence number stored in a predetermined address in a frame and the non-updating of time information stored in a predetermined address in a frame, and so on, are used. Here, the sequence number is counted up every transmission.

Further, as a result of determination, in a case where the third determination module 39 determines that multiple input values received by the first communication module 34 or multiple output values received by the second communication module 35 are abnormal, it outputs a warning signal to the terminal device 120 of the outside.

In a case where the third determination module 39 determines that multiple input values received by the first communication module 34 are abnormal, the operation executing module 33 executes an operation by the use of an input value input from the input module 20 included in the control module incorporating the operation executing module 33.

In a case where the third determination module 39 determines that multiple output values received by the second communication module 35 are abnormal, the output module 40 generates a control signal by converting an output value obtained by operation by the operation executing module 33 included in the control module incorporating the output module 40.

Figure 10:
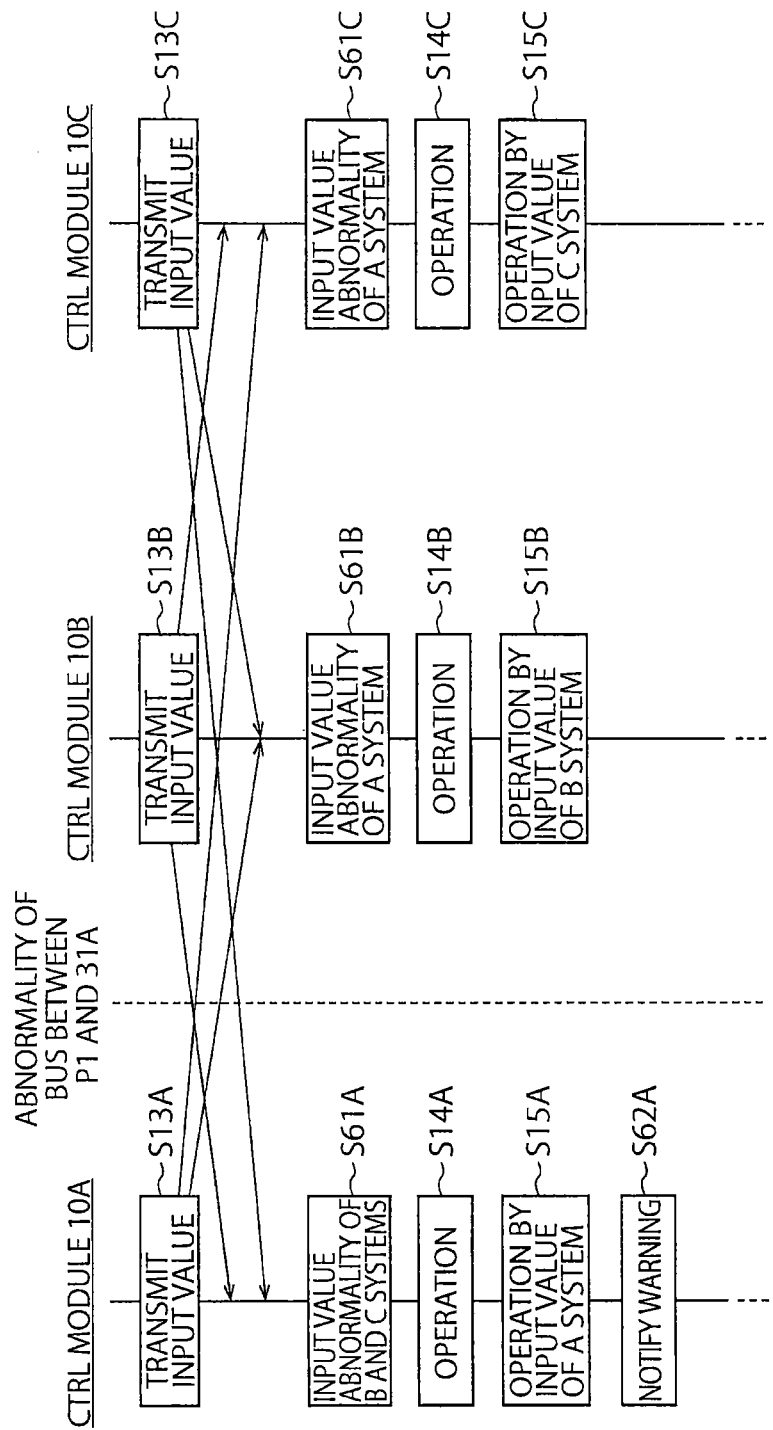
FIG. 10 is a sequence diagram illustrating an example of the processing in the case where abnormality is caused in the bus 90 between the junction P1 and the communication module 31A in FIG. 9.

For example, processing in a case where abnormality is caused between a junction point P1 and the communication module 31A in FIG. 9 in the bus 90 is described using FIG. 10. FIG. 10 is a sequence diagram illustrating an example of the processing in the case where abnormality is caused in the bus 90 between the junction P1 and the communication module 31A in FIG. 9.

(Steps S13A to S13C) The communication modules 34A to 34C transmit input values input from the input modules 20A to 20C to other communication modules.

(Steps S61A to S61C) Next, the third determination modules 39A to 39C determine whether multiple input values received by the first communication modules 34A to 34C are abnormal, on the basis of information on a predetermined address in a received frame. Here, since abnormality is caused in the bus between the communication module 31A and the communication module 31B, the first communication module 34A determines that multiple input values received from the first communication modules 34B and 34C are abnormal. Moreover, the first communication modules 34B and 34C determine that multiple input values received from the first communication module 34A are abnormal.

(Steps S14A and S15A) Next, since abnormality is caused in the bus between the communication module 31A and the communication module 31B, the first determination module 36A determines that a majority of input values do not match. Further, the operation executing module 33A executes an operation by an input value input from the input module 20A.

(Step S62A) Further, the operation module 30A transmits a warning signal to the terminal device 120 which is not illustrated.

In this sequence, a case where input values obtained by conversion by the input module 20B and the input module 20C match is assumed as an example.

(Steps S14B and S15B) The first determination module 36B determines that a majority of input values match, in parallel with steps S14A and S15A. Further, the operation executing module 33B executes an operation by an input value input from the input module 20B.

(Steps S14C and S15C) Similarly, the first determination module 36C determines that a majority of input values match, in parallel with steps S14A and S15A. Further, the operation executing module 33C executes an operation by an input value input from the input module 20C.

As mentioned above, in the multiplex control device according to the second embodiment, the first communication modules 34 are connected by the bus 90 and the second communication modules 35 are connected by the bus 90. By this means, the multiplex control device 2 according to the second embodiment can exchange an input value and an output value through the bus 90. Therefore, similar to the first embodiment, even in a case where abnormality occurs in at least two of any one of the input modules 20A to 20C, any one of the operation modules 30A to 30C and any one of the output modules 40A to 40C, since the multiplex control device 2 can keep outputting a normal control signal, it is possible to continue control of high reliability.

Moreover, the multiplex control device according to the second embodiment includes the third determination module 39 that determines whether multiple input values received by the first communication module 34 or multiple output values received by the second communication module 35 are abnormal, on the basis of information on a predetermined address in multiple frames received by the first communication module 34 from other control modules than the corresponding control module of three or more control modules or information on a predetermined address in multiple frames received by the second communication module 35 from other control modules than the corresponding control module of three or more control modules.

In a case where the third determination module 39 determines that multiple input values received by the first communication module 34 are abnormal, the operation module 30 executes an operation by the use of an input value input from the input module 20 included in the control module incorporating the operation module 30. In a case where the third determination module 39 determines that multiple output values received by the second communication module 35 are abnormal, the output module 40 generates a control signal by converting an output value obtained by operation by the operation module 30 included in the control module incorporating the output module 40.

By this means, even in a case where abnormality occurs in part of the bus and the input values and the output values which are received by the first communication module 34 and the second communication module 35 are abnormal, the operation module 30 and the output module 40 continue processing. Therefore, each control module 10 can continue control and cause the control of the multiplex control device 2 not to be stopped even if there is a failure only in the bus.

The operation modules 30A to 30C include the first communication modules 34A to 34C and the first determination modules 36A to 36C in each embodiment, but it is not limited to this, and the input modules 20A to 20C may include these and the first determination modules 36A to 36C may obtain input values output from the input modules 20A to 20C and make a determination using the obtained input values. Alternatively, the first communication modules 34A to 34C and the first determination modules 36A to 36C may exist independently from the operation modules 30A to 30C in the control modules 10A to 10C, and the first determination modules 36A to 36C may be connected with the outputs of the input modules 20A to 20C and the inputs of the lines 60A to 60C or the operation modules 30A to 30C, obtain input values therefrom and make a determination using the obtained input values.

Moreover, the operation modules 30A to 30C include the second communication modules 35A to 35C and the second determination modules 37A to 37C in each embodiment, but it is not limited to this, and the output modules 40A to 40C may include these and the second determination modules 37A to 37C may obtain output values input to the output modules 40A to 40C and make a determination using the obtained output values. Alternatively, the second communication modules 35A to 35C and the second determination modules 37A to 37C may exist independently from the operation modules 30A to 30C in the control modules 10A to 10C, and the second determination modules 37A to 37C may be connected with the outputs of the operation modules 30A to 30C and the inputs of the lines 70A to 70C or the output module 40A, obtain output values therefrom and make a determination using the obtained output values.

The multiplex control device 1 or 2 of the first or second embodiment includes three control modules 10, but it is not limited to this, and it may include four or more control modules 10.

Moreover, various kinds of above-mentioned processing according to the multiplex control device 1 or 2 of the first or second embodiment may be performed by recording a program to execute each processing of the multiplex control device 1 or 2 of the first or second embodiment in a computer-readable recording medium, and causing the program recorded in the recording medium to be read by a computer system and executed by a processor.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

The invention claimed is:

1. A multiplex control device comprising:
   three or more control modules configured to execute same operations for same input signals in parallel and to output output signals to control a same controlled target; and
   a majority decision module configured to output an output signal that matches a majority of the output signals outputted by the three or more control modules, to the controlled target as a control signal that controls the controlled target,
   each of the control modules comprising:
   an input module configured to obtain an input signal to convert the input signal into an input value;
   a first determination module configured to obtain input values from input modules of the respective control modules to determine whether a majority of input values among the obtained input values match;
   an operation executing module configured, when the first determination module determines that the majority of input values match, to execute an operation using the matched input value to generate an output value;
   a second determination module configured to obtain output values from operation executing modules of the respective control modules to determine whether a majority of output values among the obtained output values match; and
   an output module configured, when the second determination module determines that the majority of output values match, to convert the matched output value to generate an output signal, and to output the output signal to the majority decision module.

2. The device of claim 1, wherein
   each of the control modules stops the control of the controlled target when the first determination module determines that the majority of input values do not match; and
   each of the control modules stops the control of the controlled target when the second determination module determines that the majority of output values do not match.

3. The device of claim 1, wherein each of the control modules further comprises:
   a first communication module configured to transmit an input value obtained by the conversion by a corresponding input module to other communication modules, and to receive input values obtained by the conversion by input modules included in other control modules than a control module that includes the first communication module; and
   a second communication module configured to transmit an output value obtained by the operation by a corresponding operation executing module to other communication modules, and to receive output values obtained by the operation by operation executing modules included in other control modules than a control module that includes the second communication module.

4. The device of claim 3, wherein when the first communication module receives an input value from another first communication module, the first communication module transmits the received input value to other one or more first communication modules except the first communication module that is a transmission source of the received input value.

5. The device of claim 3, wherein when the second communication module receives an output value from another second communication module, the second communication module transmits the received output value to other one or more second communication modules except the second communication module that is a transmission source of the received output value.

6. The device of claim 3, wherein the first communication modules are connected by a bus, and the second communication modules are connected by a bus.

7. The device of claim 3, wherein the first communication modules are connected through a network, and the second communication modules are connected through a network.

8. The device of claim 1, wherein each of the control modules further comprises a threshold setting module configured to obtain threshold information showing a threshold from an external terminal device to store the threshold information,
wherein
the first determination module determines that the input values match each other when a difference in the input values is within the threshold; and
the second determination module determines that the output values match each other when a difference in the output values is within the threshold.

9. The device of claim 8, wherein each of the control modules further comprises:
a communication module configured to transmit the threshold information stored in the threshold setting module to other control modules than a corresponding control module of the three or more control modules, and to receive plural pieces of threshold information transmitted from other control modules than a corresponding control module of the three or more control modules; and
a third determination module configured to determine whether thresholds shown by the plural pieces of received threshold information and a threshold shown by the transmitted threshold information are different,
wherein when the third determination module determines that the thresholds are different, the threshold setting module transmits a warning signal to the terminal device.

* * * * *